(12) United States Patent
Thaw et al.

(10) Patent No.: US 12,106,303 B2
(45) Date of Patent: *Oct. 1, 2024

(54) GENERAL PURPOSE BLOCKCHAIN

(71) Applicants: David Bernard Thaw, Flower Mound, TX (US); Hyung Kyu Kang, Incheon (KR)

(72) Inventors: David Bernard Thaw, Flower Mound, TX (US); Hyung Kyu Kang, Incheon (KR)

( * ) Notice: Subject to any disclaimer, the term of this patent is extended or adjusted under 35 U.S.C. 154(b) by 11 days.

This patent is subject to a terminal disclaimer.

(21) Appl. No.: 18/321,729

(22) Filed: May 22, 2023

(65) Prior Publication Data

US 2023/0289802 A1 Sep. 14, 2023

Related U.S. Application Data

(63) Continuation-in-part of application No. 17/422,753, filed as application No. PCT/US2020/013431 on Jan. 14, 2020, now Pat. No. 11,657,062.

(Continued)

(51) Int. Cl.
*G06Q 20/14* (2012.01)
*G06Q 20/12* (2012.01)
(Continued)

(52) U.S. Cl.
CPC ....... *G06Q 20/4014* (2013.01); *G06Q 20/389* (2013.01)

(58) Field of Classification Search
CPC .......... G06Q 20/4014; G06Q 20/389
See application file for complete search history.

(56) References Cited

U.S. PATENT DOCUMENTS 11,188,977 B2 11/2021 Youb et al.
11,652,605 B2 * 5/2023 Turner .................. H04L 9/0618
380/37

(Continued)

FOREIGN PATENT DOCUMENTS

WO 2018125989 A2 7/2018

OTHER PUBLICATIONS

Shen, Charles, and Feniosky Pena-Mora. "Blockchain for cities—a systematic literature review." Ieee Access 6 (2018): 76787-76819. (Year: 2018).*

(Continued)

*Primary Examiner* — Mohsen Almani
(74) *Attorney, Agent, or Firm* — Idea Intellectual Limited; Margaret A. Burke; Sam T. Yip

(57) ABSTRACT

A general purpose blockchain (GPB) platform for creating, maintaining, and managing a distributed ledger. The GPB comprises multiple nodes, each configured to host a GPB for storing GPB arbitrary objects. Each GPB arbitrary object comprises an object data, wherein the object data being a structured or unstructured data; a basic data structure implemented in a data markup language that provides self-description of the object data with at least fields for storing the object's origin, the object's owner, the object's transfer history, object's modification/transformation history, the object type, and the object data; and a universal interface for providing an encapsulation or reference to the object data for accessing the object data and an transformation function to allow interoperability of object data of different formats. A plurality of GPB s collectively maintain consensus of changes of the stored GPB arbitrary objects with a plurality of other GPBs.

13 Claims, 9 Drawing Sheets

Arbitrary Object Data Structure and Fields Specification

| Field Name | Type | Scope | Data Format | Description |
|---|---|---|---|---|
| origin | required | universal | GUID | This field specifies the origin of the object. It provides a reference to the globally unique identifier (GUID) of the object or service that first instantiated the object. |
| owner | required | universal | GUID | This field specifies the current owner of the object. It provides a reference to the GUID of the object or user with current full ownership rights of the object. An object may have subsidiary ownership/use rights (i.e., in dApps), but all objects have exactly one owner, similar to the principle found computer security access control lists. |
| transfer history | required | universal | list | This field contains a history of all changes to the field "owner" of the object. |
| modification/ transfer history | required | universal | list | While not all objects undergo transformations, all objects must maintain a field for this in the event a future context or application transforms them. |
| object type | required | universal | string | This field specifies the object type (i.e., resource object, property object, etc.). It is maintained as an open-ended string to allow for the creation of new object types by users of the platform (i.e., by new dApps). |
| object data | required | universal | pointer/ reference | The object data field is a pointer or reference to the data, resource, or other information stored within, controlled by, accessed through, or otherwise handled by the object. The data type to which this field references will depend on the object type and its implementation. |

Related U.S. Application Data

(60) Provisional application No. 62/836,661, filed on Apr. 21, 2019, provisional application No. 62/792,381, filed on Jan. 14, 2019.

(51) Int. Cl.
  *G06Q 20/38* (2012.01)
  *G06Q 20/40* (2012.01)
  *G06Q 30/06* (2023.01)
  *G06Q 30/0601* (2023.01)
  *G06Q 40/04* (2012.01)
  *H04L 9/00* (2022.01)

(56) References Cited

U.S. PATENT DOCUMENTS

| | | | |
|---|---|---|---|
| 2017/0039330 A1 | 2/2017 | Tanner, Jr. et al. | |
| 2017/0046689 A1 | 2/2017 | Lohe et al. | |
| 2017/0169125 A1 | 6/2017 | Greco et al. | |
| 2018/0005186 A1 | 1/2018 | Hunn | |
| 2018/0315141 A1 | 11/2018 | Hunn et al. | |
| 2018/0336552 A1 | 11/2018 | Bohli et al. | |
| 2019/0005469 A1 | 1/2019 | Dhupkar et al. | |
| 2020/0357084 A1* | 11/2020 | Lerato Hunn | G06F 16/2379 |
| 2021/0192059 A1* | 6/2021 | Watanabe | H04L 9/0861 |
| 2022/0261882 A1* | 8/2022 | Youb | G06Q 30/02 |
| 2023/0080322 A1* | 3/2023 | Smith | H04L 9/3265 |
| | | | 726/7 |

OTHER PUBLICATIONS

Saffaf, Mohammad Nour. "Blockchain: Analysis, Comparison and Critiques." (2018). (Year: 2018).*

Jonas Valbjørn Andersen et al., "Patterns of Self-Organising in the Bitcoin Online Community: Code Forking as Organising in Digital Infrastructure", Thirty Eighth International Conference on Information Systems, 2017.

Hong Heather Yu, "On content protection for mobile consumer multimedia applications", 2004 IEEE International Conference on Multimedia and Expo, Institute of Electrical and Electronics Engineers, 2004, vol. 1, pp. 439-442.

Jennifer L. Welch, "Distributed Computing col. 70: Formalizing and Implementing Distributed Ledger Objects", ACM SIGACT News, Association for Computing Machinery, Jun. 2018, vol. 49, No. 2, pp. 57.

Wei Huang et al., "The State of Public Infrastructure-as-a-Service Cloud Security", ACM Computing Surveys, Association for Computing Machinery, Jun. 2015, vol. 47, No. 4, pp. 1-31.

Marco Conoscenti et al., "Blockchain for the Internet of Things: a Systematic Literature Review", 2016 IEEE/ACS 13th International Conference of Computer Systems and Applications (AICCSA), Institute of Electrical and Electronics Engineers, 2016.

Antonio Fernández Anta et al., "Formalizing and Implementing Distributed Ledger Objects", ACM SIGACT News, Association for Computing Machinery, Jun. 2018, vol. 49, No. 2, pp. 58-76.

* cited by examiner

Arbitrary Object Data Structure and Fields Specification

| Field Name | Type | Scope | Data Format | Description |
|---|---|---|---|---|
| origin | required | universal | GUID | This field specifies the origin of the object. It provides a reference to the globally unique identifier (GUID) of the object or service that first instantiated the object. |
| owner | required | universal | GUID | This field specifies the current owner of the object. It provides a reference to the GUID of the object or user with current full ownership rights of the object. An object may have subsidiary ownership/use rights (i.e., in dApps), but all objects have exactly one owner, similar to the principle found computer security access control lists. |
| transfer history | required | universal | list | This field contains a history of all changes to the field "owner" of the object. |
| modification/ transfer history | required | universal | list | While not all objects undergo transformations, all objects must maintain a field for this in the event a future context or application transforms them. |
| object type | required | universal | string | This field specifies the object type (i.e., resource object, property object, etc.). It is maintained as an open-ended string to allow for the creation of new object types by users of the platform (i.e., by new dApps). |
| object data | required | universal | pointer/ reference | The object data field is a pointer or reference to the data, resource, or other information stored within, controlled by, accessed through, or otherwise handled by the object. The data type to which this field references will depend on the object type and its implementation. |

FIG. 5

Resource Object Data Structure and Fields Specification*

| Field Name | Type | Scope | Data Format | Description |
|---|---|---|---|---|
| provider | required | universal | GUID | This field specifies the provider of the object. It provides a reference to the globally unique identifier (GUID) of the user, object or service that is providing the computational resource |
| resource type | required | universal | string | This field specifies the type of computational resource being provided (i.e., CPU, GPU, ASIC, storage, etc.) |
| processing unit(s) | required | universal | list of pointers/ references | This field contains a list of pointers or references to any computational processing resources provided by the object. While all objects must have this field, not all objects need implement it and it may be reported as not available.<br><br>*(As a practical matter, most resources must have at least some processing resources for operation. However, not all resources necessarily will expose that to the user via the object.)* |
| transient memory | required | universal | list of pointers/ references | This field contains a list of pointers or references to any transient memory resources (whether volatile or otherwise) provided by the object. While all objects must have this field, not all objects need implement it and it may be reported as not available.<br><br>*(As a practical matter, most resources must have at least some transient memory for operation. However, not all resources necessarily will expose that to the user via the object.)* |
| persistent memory | required | universal | list of pointers/ references | This field contains a list of pointers or references to any persistent memory resources (nonvolatile or otherwise) provided by the object. |
| countable resource | optional | contextual | list of pointers/ references | This field contains a list of pointers or references to any other arbitrary computational resources, which can refer to any addressable computational resource (i.e., in a traditional personal computer, a communications device such as a USB, parallel, or other bus). |

* *GPB objects ultimately derive from the arbitrary object and also inherit the AO's fields*

FIG. 6

Property Object Data Structure and Fields Specification*

| Field Name | Type | Scope | Data Format | Description |
|---|---|---|---|---|
| object data | required | universal | pointer/ reference | This field provides a pointer or reference to the core data stored or referenced by the object. Although technically defined as a pointer/reference, it is intended to be a generic field capable of addressing any of an XML data object, a separate pointer or reference to an external object, or a linked list, tree, or other data structure of XML data objects or external references. References to external objects need not refer to XML data, although any intake of that data would be processed through the XML wrapper in the best implementation. |
| data field 1 | optional | contextual | string | This field contains optional data defined by the service or dApp creating the object. It may, but need not, contain data derived from XML markup (or other language markup).<br><br>There may be an arbitrary *n* number of these fields as defined by the object instantiator. |
| data field 2 | optional | contextual | | |
| * * * | optional | contextual | | |
| data field *n* | optional | contextual | | |

*\* GPB objects ultimately derive from the arbitrary object and also inherit the AO's fields*

FIG. 7

GENERAL PURPOSE BLOCKCHAIN

CROSS-REFERENCES WITH RELATED DOCUMENTS

The present application is a continuation-in-part application of U.S. patent application Ser. No. 17/422,753 filed Jul. 14, 2021, which claims priority to U.S. Patent Application No. 62/792,381 filed Jan. 14, 2019, and U.S. Patent Application No. 62/836,661 filed Apr. 21, 2019; the disclosures of which are incorporated herein by reference in their entirety.

FIELD OF THE INVENTION

The present invention relates generally to distributed storage and management of digital information. More specifically, the present invention relates to distributed data ledger systems.

BACKGROUND OF THE INVENTION

Digital data is used to represent personal properties, drives our decision makings, and mediates our interactions with machines and with one another. Data is essentially a key commodity, arguably one of the most valuable assets, of contemporary society. Digital data may take many different forms, which makes its processing and management a substantial overhead and economic inefficiency. Distributed ledger, such as Blockchain, technologies present a potential solution to this problem of data management, but currently are limited in their ability only to manage well-structured data.

Blockchain technologies create the ability to exchange digital objects in a manner similar to traditional notions of transfer of property rights surrounding physical objects. The most prevalent example, Bitcoin, is a cryptographic digital token that represents value (similar to a commodity) and can be exchanged by holders much like cash. These exchange transactions are verified and recorded by distributed ledgers maintained by millions of public Internet-connected computing devices around the world. The distributed nature of this ledger verification and recordation process, coupled with an "agreement" protocol known as a consensus algorithm (hereinafter referred to as distributed verification technology (DVT)), enables blockchain-based technologies to operate without any one single centralized authority.

DVT is the core of the blockchain concept. It comprises two essential elements: (1) a distributed data structure to maintain information; and (2) a consensus mechanism (algorithm) to govern and prove the authenticity of work performed by nodes participating in the distributed network. A DVT is capable of maintaining consensus, or agreement about the accuracy, regarding data without the need for a centralized authority. DVTs thus can enable collective "answering of questions" and maintenance of data records. DVTs also provide the data structure which stores (or links to) the data they authenticate. The combination of these two items together—a distributed verification network, and a distributed data structure—form the DVT itself.

DVTs reduce transaction costs, enable traditional property rights (i.e., cash "ownership") of digital objects, and obviate the inefficient rent extraction centralized entities such as banks are capable of charging the market. Current blockchain technologies, however, generally are "hard-coded" and focus only on the storage and verification of a specific type or limited set of objects. As a result, each new application may need its own blockchain or may have to sacrifice many of the benefits of blockchain by constructing clumsy, hard-coded inputs into existing blockchains.

The Bitcoin blockchain was the first example of a DVT, and encapsulates the idea of the "Blockchain 1.0" concept—distributed verification of static tokens. The Bitcoin tokens are, quite literally, static cryptographic tokens which can be exchanged among "owners" via a provably-hard public key cryptographic system. The result is a first-generation form of digital property—static tokens which can be "owned" and "possessed" like physical-world tangible property. Although the computational engine which operates the Bitcoin network does have at least some ability to perform arbitrary computation, to the extent that the ability exists, it is constrained as a matter of implementation. Practically speaking, therefore, Bitcoin and other "Blockchain 1.0" implementations generally can do little more than providing the storage, management, and exchange of tangible property rights described above using pre-defined (static) tokens.

Second generation blockchain technologies ("Blockchain 2.0"), which are often used to implement "smart contracts," are a first step in bridging this gap to allow arbitrary transactions. Technologies like the Ethereum blockchain were designed to allow parties to encode executable contracts into code, which would automatically trigger and transfer value (in the form of the Ethereum token) when specified conditions were satisfied. "Blockchain 2.0" includes the capability to implement arbitrary computation, or the development of what computer science refers to as a "Turing-complete" virtual machine (VM). Such a VM was not fully utilized for the limited-purpose DVT implementations of most static "Blockchain 1.0" tokens. Although Bitcoin's early generation VM technically is Turing-complete from a mathematical perspective, it is not implemented in a manner practically capable of supporting general purpose computation. As these cryptocurrencies gained popularity in online commerce, however, the market wanted DVTs to implement computationally self-executing agreements regarding the exchange of tokens.

This demand led to the development of Ethereum (and other) platforms to implement the so called "Smart Contracts." Ethereum is essentially a DVT that implements a Turing-complete VM, the Ethereum Virtual Machine (EVM), capable of arbitrary general-purpose computation, though highly inefficiently, and uses its platform to implement token ownership concurrent with encodable agreements regarding when and how ownership will change. Implementing this type of encodable agreement—a programmatic language to specifying terms and conditions under which a token-based transaction will take place—effectively requires arbitrary computation to allow a contracting language with sufficient flexibility. Since the computational function of this verification is managed by the EVM, it is technically possible to create arbitrary programs which run on the Ethereum network. While Ethereum does technically implement this capability, it is limited however by two critical design constraints. First, the EVM does not scale—it lacks the computational capacity to handle more complex distributed applications (dApps). Second, the EVM is designed to implement contracts, and as such the language is constructed with that purpose in mind. Therefore, "Blockchain 2.0" represents a substantial advance forward; however, it still fails to address issues of interoperability and general transaction (i.e., more than just complete ownership transfer) of arbitrary objects.

SUMMARY OF THE INVENTION

It is an objective of the present invention to provide a general purpose blockchain (GPB) that addresses the aforementioned shortfalls in the current blockchain technologies. It is another objective of the present invention to provide such GPB with a DVT implementation that not only allows scalable arbitrary computational verification of digital objects, but also is agnostic as to the types of object. Such GPB aims to provide the capability of native arbitrary computation and storage of any type of digital object, thus achieving an "object agnostic" blockchain. The types of digital object include at least cryptocurrency token; non-fungible token (NFT) and its variants, such as dynamic NFT (dNFT), Soulbound token (SBT), record data object, virtual objects, references to physical objects, and other property-types objects; resource-types objects such as representations of physical computational devices. It allows unrestricted App development, ownership, trade, and general transaction of any type of digital object.

In accordance to one aspect of the present invention, the GPB handles the various different types of digital object via GPB arbitrary objects. Each of GPB arbitrary objects comprises a basic data structure and a universal interface to structured data. This universal interface allows objects to encapsulate or reference data of varying types and formats, even if that data is not structured. At least a portion of each GPB arbitrary object is specified by the various GPB platform interfaces to allow interoperability.

In accordance to another aspect of the present invention, the GPB platform comprises a knowledge farm for storing and managing searchable knowledge data and an insight function for generating and managing knowledge data and knowledge queries. The ability to encapsulate, integrate, and represent arbitrary objects and physical computational devices together in the same plurality of nodes enables the ability to derive knowledge from multiple sources, facilitate communication and interaction among those sources, and integrate their operations in an interoperable fashion.

The insight function creates new knowledge for the knowledge farm by querying the integrated nodes and the inherently interoperable GPB arbitrary objects. Furthermore, the metadata generated by the operations of the GPB platform in itself generates knowledge for the knowledge farm and can also be used in determining responses to insight queries.

Additionally, the nature of the DVT data structure comprising the GPB can implement a variety of artificial intelligence data structures, permitting the GPB to directly or indirectly generate and predict query answers based not only on Large-Language models but also any arbitrary stochastic process capable of being modeled.

In accordance to one implementation of the present invention, the GPB platform enables a bridging function for electronic gaming, which uses the GPB arbitrary objects and the arbitrary consensus to facilitate the management, ownership, transaction, and integration of digital objects, such as in-game items, across and within one or more electronic gaming platforms.

In accordance to another implementation of the present invention, the GPB platform enables a general purpose metaverse. The general purpose metaverse extends the bridging function applied to electronic gaming systems and in-game items to general purpose digital objects, all of which collectively comprise a metaverse instantiation.

In accordance to another aspect of the present invention, the GPB can be used to recapture unused computational cycles maintained by computing systems but generally not used without statistically-significant increases in power, by leveraging parallel computing, power management and computational priority, and memory and other resource virtualization. The GPB platform, together with the use of GPB arbitrary objects, encapsulate virtualized resources and isolate them for security purposes. The deadweight loss recapture may also be monetized under a "share-to-earn" scheme in which nodes in the GPB platform are encouraged to trade data and contribute unused computational resources.

BRIEF DESCRIPTION OF THE DRAWINGS

Embodiments of the invention are described in more detail hereinafter with reference to the drawings, in which:

FIG. 5 depicts a table listing the GPB arbitrary object data structure and fields specification in accordance with one embodiment of the present invention;

FIG. 6 depicts a table listing the resource object data structure and fields specification in accordance with one embodiment of the present invention;

FIG. 7 depicts a table listing the property object data structure and fields specification in accordance with one embodiment of the present invention;

DETAILED DESCRIPTION

Figure 1:
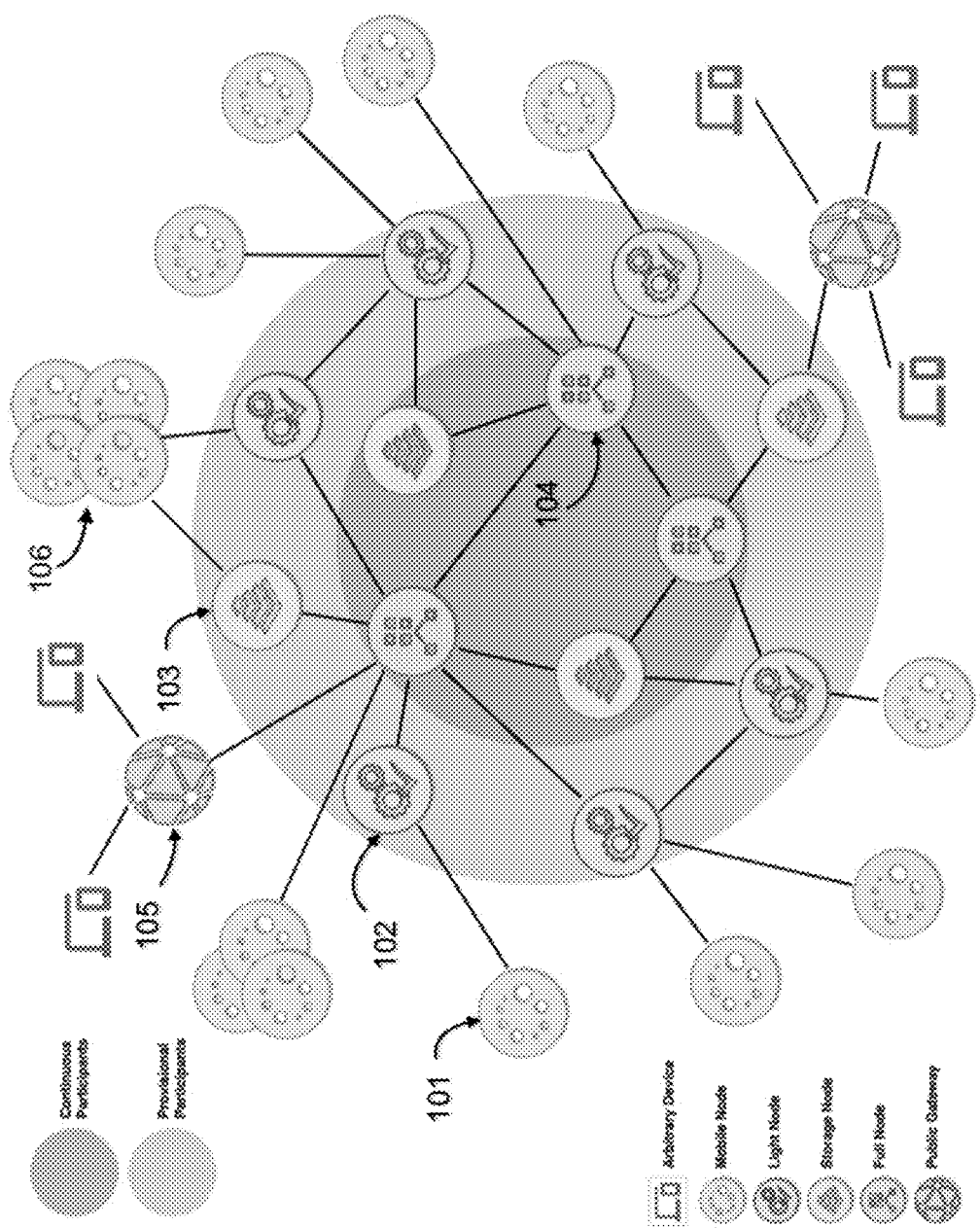
FIG. 1 depicts a schematic architecture diagram of a GPB platform in accordance to one embodiment of the present invention.

In the following description, methods and systems for creating, maintaining, and managing distributed data structures and the associated data and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation. Throughout the rest of this document, embodiments of the present invention are referred to as the GPB.

The conventional cryptographic methods used to confirm distributed transaction verifications of blockchain objects depend on a strict definition of the underlying digital object such as Bitcoin ("Blockchain 1.0"). Even with the development of Ethereum and smart contracts ("Blockchain 2.0"), the distributed transaction verifications of objects in these blockchains still rely to some degree on the specification of the underlying object within the data structure. These conventional implementations fail to provide the ability to store an arbitrary object within the "ledger", or the data structure upon which the DVT operates. This issue is further complicated when mixing objects of different types (i.e., a multimedia file and a textual medical record) within the same data structure. In other words, collectively storing all of a token, a multimedia object, and an arbitrary data file together requires the blockchain and associated DVT to implement some type of interface that allows the cryptographic processing of different types of objects. This is particularly difficult in the case where objects contain unstructured data, such as multimedia data.

The present invention solves this problem. In short, the GPB platform comprises an interface for interacting with arbitrary objects ("GPB arbitrary objects"), or having the interface built in the GPB arbitrary object. The interface transforms unstructured data into structured, extensible data without loss of fidelity of the underlying data. This is accomplished through a transformation function, which takes as input any arbitrary form of data and provides as output a structured data object upon which cryptographic and other operations necessary to the functions of DVTs (i.e., blockchain "consensus", distributed "ledger" maintenance, etc.) can be performed collectively by a plurality of GPB blockchains. One proposed method of creating this structured output uses open-standard, extensible markup language (XML) data. The structured nature of XML data allows for the development of a DVT, consensus algorithm, and data structure that form an object-agnostic blockchain. XML is one of many possible technologies that is widely-available, based on open standards, and extensible that can be used for this purpose. Others include the JavaScript Open Notation (JSON) technology. An ordinarily skilled person in the art would be able to adopt other proprietary and open-standard data markup or formatting techniques without undue experimentation and deviation from the spirit of the present invention.

GPB can also realize many of the as-yet-untapped potentials of blockchain, smart contracts, and distributed computing. Currently, smart contracts must depend on outside data sources that are not verifiable by the blockchain (also known as "oracles") as inputs to smart contracts for the purpose of computationally-enforcing those smart contracts. If an oracle is compromised or manipulated, the smart contract can execute under conditions other than its original parties' intent. In other words, reliance on centralized authority is still necessary with Blockchain 2.0 smart contracts. A similar vulnerability or limitation would apply to external data sources used for dApps implemented under existing smart contract systems. GPB, by contrast, allows external data sources to be incorporated into the DVT of the GPB, allows them to be verified by the DVT, and reduces reliance on centralized external authorities for computational enforcement of smart contracts.

With Bitcoin and Ethereum mining, it is possible to develop a true-incentive structures for users to apply their unused computing resources to large scale projects. In return for contributing their resources, users receive compensation in the form of small amounts of tokens of the blockchains they maintained, forming a profit-driven market. However, the development of application-specific integrated circuits (ASICs) and the rapid increases in mining demands quickly priced average users out of these markets. Additionally, no value was provided to the user beyond the maintenance of the token itself. In other words, the user's compensation is heavily tied to the volatile nature of the particular token in question. No inherent value necessarily is being recaptured by the DVT.

GPB arbitrary objects are not limited to tokens that represent currencies. GPB's true scalable arbitrary computation and object agnostic nature mean that developers can build dApps of all types much like how developers currently build software applications for computers and mobile devices. By focusing on general purpose computation, and developing ASIC-resistant verification and consensus algorithms, GPB can provide users with inherent incentives to participate in the blockchain by offering their unused computational resources. Since the types of computation to be implemented are the same as those demanded by the blockchain itself (i.e., Turing-complete, scalable, and general purpose computing), the ability of mining consortia to develop ASICs that can ultimately force average users out of the market is limited. Additionally, users with expert knowledge in certain domains (i.e., local weather authorities) can be incentivized to contribute their domain knowledge through this infrastructure as well. Such a system can allow GPB to develop consensus not only around ownership and rights of digital objects, but also around the authenticity and provenance of digital objects' representations of physical world characteristics.

The end result is not only an effectively interoperable blockchain capable of performing scalable, arbitrary computation on objects of multiple types, but a business model capable of better recapturing the deadweight loss of the billions of computing devices around the world that operate 24 hours 7 days a week but never utilize anywhere near their computational capacity for the amount of energy they consume.

Referring to FIG. 1. In accordance to various embodiments of the present invention, provided is a GPB platform within an GPB ecosystem having a plurality of human and/or machine participants. Each participant has access and/or control of one or more physical entities, and can play different roles during particular periods of time according to their business needs and the resources they own. The physical entities in the network that have unique identifiers and descriptions of their functions are nodes that make up the GPB platform. In accordance to one embodiment, nodes in the GPB platform can be of types including: mobile node 101, light node 102, storage node 103, full node 104, and public gateway 105. The following describes these node types in details.

Mobile Node

| | |
|---|---|
| Purposes | produce, monetize and consume information |
| Functions | produce data and GPB arbitrary objects; transform data; consume information |
| Data flows | In: real world data, GPB arbitrary objects, transformation tasks |
| | Produce: GPB arbitrary objects, questions/requests |
| | Out: GPB arbitrary objects, insights, answers, suggestions, predictions, transformation tasks results |

-continued

| | |
|---|---|
| Supported abstraction layers | application layer; integration layer; execution layer; security layer |
| Node strategies | upload and disappear; ask questions and wait for answer; receive transformation task and provide results |
| Hosts (executors) | mobile computing devices; IoT devices; edge devices; automotive devices |

Light Node

| | |
|---|---|
| Purposes | Benefit from participation in the GPB platform |
| Functions | validate GPB arbitrary objects; validate signatures and ownership; validate transformations; schedule, run and manage transformations; validate transformation results |
| Data flows | In: GPB arbitrary objects, transformations<br>Produce: GPB arbitrary objects, transformation tasks, canonical results<br>Out: integrity and ownership statuses, GPB arbitrary objects, transformation results |
| Supported abstraction layers | execution layer; consensus layer; security layer |
| Node strategies | receive transformation, manage it and return result; Receive request for GPB arbitrary object validation, fulfil and provide response |
| Hosts (executors) | mobile computing devices; edge devices; automotive devices |

Storage Node

| | |
|---|---|
| Purposes | Store and provide access to data |
| Functions | persist GPB arbitrary objects; persist distributed arbitrary graphs; store and manage unstructured data; store and manage other information |
| Data flows | In: GPB arbitrary objects, requests for GPB arbitrary objects<br>Out: GPB arbitrary objects |
| Supported abstraction layers | persistence layer; security layer |
| Node strategies | manage and execute storage related requests |
| Hosts (executors) | mobile computing devices; stationary computing devices; processing servers |

Full Node

| | |
|---|---|
| Purposes | Actively participate in the GPB platform on constant basis |
| Functions | All of Light and Storage Nodes functions; participate in platform consensus; participate in arbitrary consensus; support accounts and resources governance |
| Data flows | In: unstructured and structured data, GPB arbitrary objects, requests, transformations, network information<br>Produce: GPB arbitrary objects, distributed arbitrary graph, transformation results, ownership changes, network statuses<br>Out: GPB arbitrary objects, transformation results, distributed arbitrary graph, network statuses, governance operation results |
| Supported abstraction layers | all layers |
| Node strategies | always on; respond to each request with fulfilment or redirect; broadcast statuses; discover network changes |
| Hosts (executors) | stationary computing devices; processing servers |

Public Gateway

| | |
|---|---|
| Purposes | Access data without running node |
| Functions | Bridge requests from users to nodes; encrypt/decrypt data; verify data integrity; provides P2P tracking |
| Data flows | In: requests, GPB arbitrary objects<br>Out: GPB arbitrary objects, integrity and ownership statuses |

| Supported abstraction layers | data access layer; security layer |
| --- | --- |
| Node strategies | receive client requests, reshape requests and fulfill or pass to designated nodes; wait for obtained request; deliver result to client |
| Hosts (executors) | processing servers |

Figure 2:
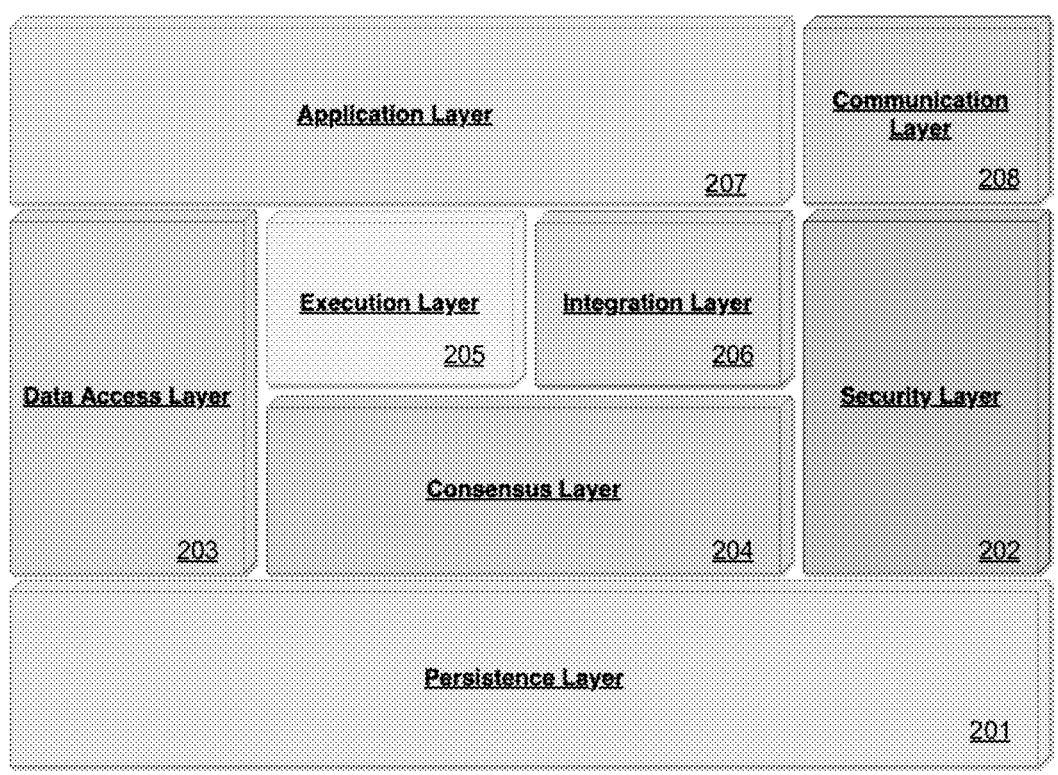
FIG. 2 depicts a logical block diagram of the GPB platform's logical layers.
Figure 3:
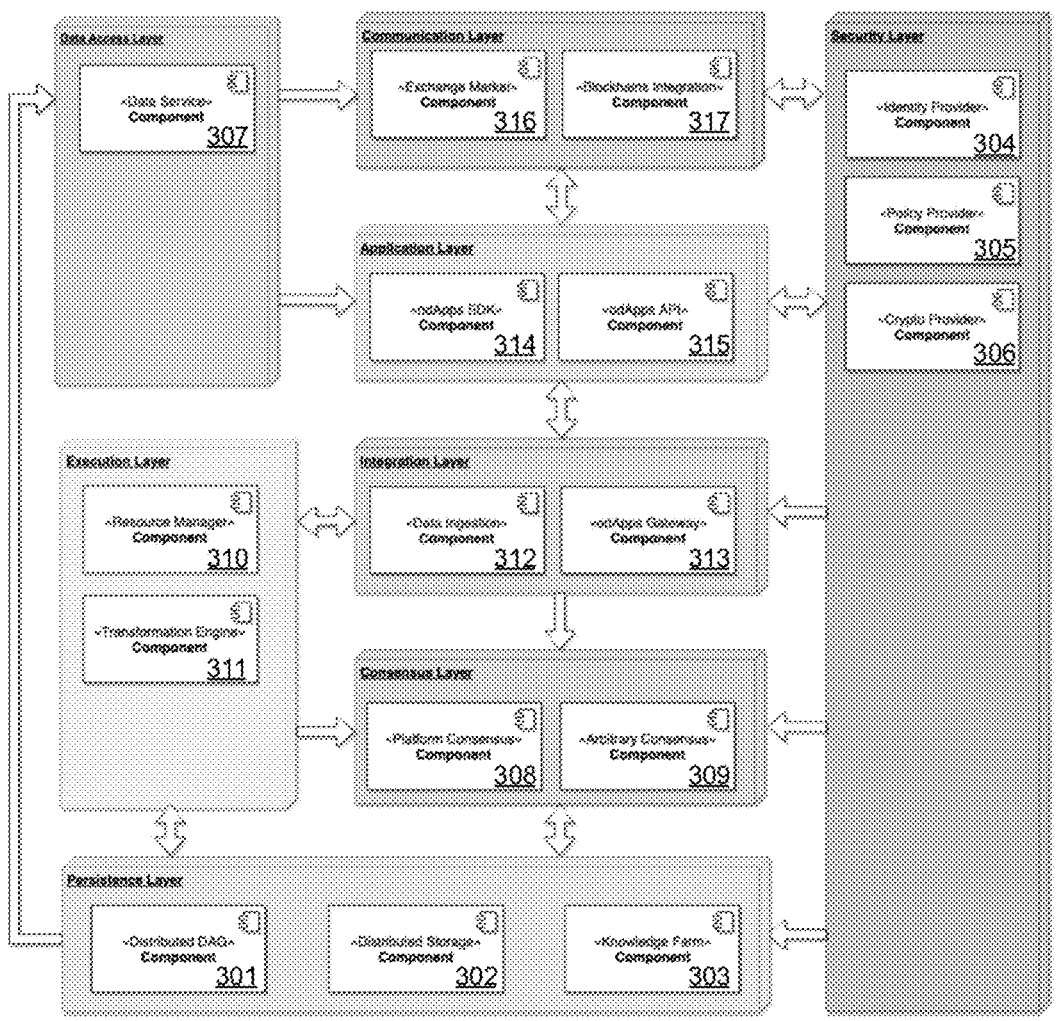
FIG. 3 depicts a logical block diagram of the GPB platform's components.

Referring to FIGS. 2 and 3. In accordance to one embodiment of the present invention, the GPB platform logical architecture comprises the following abstraction layers: a persistence layer 201, a security layer 202, a data access layer 203, a consensus layer 204, an execution layer 205, an integration later 206, an application layer 207, and a communication layer 208. Each of these abstraction layers can be implemented as one or more specially configured computing processors (nodes) in a distributed computing environment (the GPB platform) in the GPB blockchain ecosystem each executing one or more sets of machine instructions that implement the logic steps of various blockchain functionalities and the methods in accordance to the embodiments of the present invention.

Persistence Layer

The persistence layer 201 is responsible for distributed storage of distributed arbitrary graph with one or more arbitrary objects. The persistence layer 201 provides a peer-to-peer method of storing both unstructured and structured data, and accumulating derived knowledge. In one embodiment, the persistence layer 201 comprises a distributed arbitrary graph component 301 for building, managing, preserving, and distribution of the distributed arbitrary graph, wherein the distributed arbitrary graph comprises one or more vertices, each representing an GPB arbitrary object and its transformation; and one or more edges, each representing a relation and reference between a block and a GPB arbitrary object. The persistence layer 201 further comprises a distributed storage non-transient memory 302 for storing all data of the GPB platform. This component can be implemented as a distributed file system that can operate anywhere on the spectrum from full global interconnectivity to private storage. The persistence layer 201 further comprises a knowledge farm 303 for accumulating information (i.e., insights, answers, etc.) generated in the GPB platform and providing search functionality over distributed content. In one embodiment, the knowledge farm 303 is a distributed information warehouse, which can be implemented by i.e. a relational database separated from GPB platform's operational storage. Users can search and access static information in the knowledge farm 303 subject to data owners' access permission settings. The interface the knowledge farm 303 is exposed to dApps and it does not transform (aggregate) data while delivering it to the requester.

Security Layer

The security layer 202 provides the functionalities of enrollment and registration of entities (users) using and/or administering the GPB platform. The security layer 202 includes at least a user authentication and authorization module, a policy management module, and cryptographic services module. In one embodiment, the security layer 202 comprises an identity provider 304 for enrolling, maintaining, and managing identity information for entities (i.e., users) in the GPB ecosystem. The identity provider 304 follows the self-sovereign identity concept and provides authentication services to dependent components within the GPB ecosystem. The security layer 202 further comprises a policy provider 305 for creating and managing policies governing permissions for various tasks for the components in the GPB platform. The security layer 202 further comprises a crypto provider 306, which implements cryptographic standards and algorithms, and provides services for key generating, hash operations, encryption/decryption of data, and sign/verify functionality.

Data Access Layer

The data access layer 203 provides an access interface to immutable data, stored information, and derived knowledge data. In one embodiment, the data access layer 203 comprises a data service component 307 for providing read access to data for the application layer 207 and the communication layer 208; and for abstracting storage type and forms of the data.

Consensus Layer

The consensus layer 204 provides the functionalities of the generation of agreements between the content and order of vertices in the distributed arbitrary graph; and the verification of object ownership and arbitrary consensus on any data accessible from the arbitrary objects. In one embodiment, the consensus layer 204 comprises a platform consensus handler 308 for enabling the production and confirmation of blocks, and managing GPB arbitrary object ownership. The platform consensus handler 308 implements the decentralized consensus algorithms and required governance procedures. The consensus layer 204 further comprises an arbitrary consensus handler 309 for allowing plug-in additional consensus algorithms (i.e., to use in conjunction with Platform Consensus). The arbitrary consensus handler 309 is flexible and provides external dApps with customization interfaces.

The platform consensus handler 308 manages GPB arbitrary object ownership and facilitates the governance of the GPB platform using a proof-of-rating (PoRt) model that depends on the aggregated rating of the participants (i.e., object signer or voter) in the GPB ecosystem. Rating is computed using the participant's resource telemetries, behavior, and the validity of the participant's objects. For example, if a participant frequently asserts the correct attributes of its objects, that participant's rating would increase. Likewise, a participant who makes fraudulent assertions regarding attributes of its objects, or who frequently asserts erroneous attributes about its objects, would have the participant's rating decreased. In other words, a participant's rating is the result of contributions having intrinsic values, where such values would be diminished if her rating were to drop as a result of fraudulent activity. PoRt operates in similar way as a proof-of-authority (PoA) network with a threshold, where only nodes with a sufficiently high rating can sign and validate objects. In general, a more positive rating connotes a more trusted and active participant. More negative ratings connote lower trust and/or activity and work to prevents participants from making important decisions regarding GPB platform operations. In one embodiment, the rating threshold required for participants to perform certain operations is calculated based on functions of averages of ratings of all users throughout the system (or relevant portion thereof) over defined time periods. These functions, for example, could be simple averages or medians, or could be based on certain numbers of standard deviations above or below a mean, or other functions as appropriate to the context. While the overall system must select some global functions for certain global operations, contextual subsets of the system can select alternates as appropriate for certain operations within their respective contexts.

The arbitrary consensus handler 309 employs a proof-of-data consensus model. The idea is that dApps can build their consensus mechanisms on top of the GPB data structure (arbitrary objects and distributed arbitrary graph) incorporating any subset of objects they want. Using proof-of-data consensus, it gives dApps the ability to form temporary or persistent subgraphs to analyze information, transform data, or perform other operations necessary for the business goals of the dApps. For example, a dApp evaluating the worth of specialized valuables, such as art works, might form such subgraphs to allow participant-experts to submit valuations of the valuables to determine pricing. The arbitrary consensus handler 309 provides confirmation of data persistence, information extraction validation, tamper resistance for data, and data ownership management. The arbitrary consensus function is distinct from the object ownership function in that it can be used by the system, by dApps, and by other services to reach distributed agreement (consensus) regarding nearly any data point visible to the system or to the relevant subgraph of the system in use by the dApp.

Execution Layer

The execution layer 205 arbitrates available distributed computing and data storage resources among competing executions. The execution layer 205 also manages data transformation, evaluation, derivation of knowledge, and creation of the arbitrary objects. In one embodiment, the execution layer 205 comprises a resource manager 310 for tracking and verifying distributed computational, storage and memory resources, allocating these resources to different components and nodes in the GPB ecosystem, scheduling and monitoring resources according to demand and resource availability. The execution layer 205 further comprises a transformation engine 311 for scheduling and executing jobs based on transformations; it also monitors and audits job execution.

Integration Layer

The integration layer 206 is responsible for uploading and adopting unstructured or structured data from different sources. In one embodiment, the integration layer 206 comprises a data ingestion module 312 for building ETL pipelines for various data sources, orchestrating the execution of the ETL pipelines, and delivering data to the GPB platform. The execution layer 205 further comprises a dApps gateway 313 for encapsulating other components and providing one or more APIs tailored to the application layer 207. The dApps gateway 313 is responsible for authentication, monitoring, load balancing, caching, request shaping, and management of various functions of the GPB platform.

Application Layer

The application layer 207 provides an application programming interface and a user interface for external systems and applications, and users to interact with the GPB platform. In one embodiment, the application layer 207 comprises a dApps software development kit (SDK) 314, which includes a set of tools and programming libraries for incorporations in and use by dApps interacting with the GPB platform; and one or more dApps APIs 315 providing a standardized data access between dApps and the GPB platform, and systematic invocations of various services and functionalities of the GPB platform. In one embodiment, the dApps SDK 314 and APIs 315 include methods, procedures, and a language specification for defining, creating, instantiating, and manipulating arbitrary objects. The language specification further includes one or more data formatting specifications for data, fields, streams, objects, and other data passed to and from arbitrary objects via the application layer 207. dApps built using the SDK 314 and APIs 315 are able to communicate with any otherwise-compatible arbitrary object within the system. Since the system permits extensibility of the arbitrary object model and development of customized dApps, some of those customizations might render some dApps unable to fully address the customized arbitrary objects of other dApps. However, if implemented properly using the SDK 314 and APIs 315, all services and dApps should be able to address the core functions of all arbitrary objects (i.e., ownership).

Communication Layer

The communication layer 208 provides the supports for exchange of the GPB arbitrary objects and interconnections with other blockchain platforms. In one embodiment, the communication layer 208 comprises an exchange market 316—an online computing resource providing the functionalities of listing of buy/sell quotations on arbitrary objects, securely monitoring and facilitating trading of arbitrary objects. Through the invocations and executions of the one or more dApps APIs 315, dApps can interact with the GPB platform for general trading of GPB arbitrary objects. Through the use and incorporation of dApps SDK 314, implementation-specific and/or dApp-specific exchange systems can be developed and managed by the user community and dApp developers. The communication layer 208 further comprises a blockchain integrator SDK 317, which provides tools for inter-blockchain communication and generation of external blockchains proofs.

Arbitrary Object

In accordance to one aspect of the present invention, each of GPB arbitrary objects contains a basic data structure implemented in an open-standard, extensible markup language. XML is such a language and a first proposed method for implementing in part arbitrary objects in accordance to one embodiment of the present invention. JavaScript Object Notation (JSON) is another such compatible example in accordance to another embodiment of the present invention. XML provides self-description of data inside an object. A GPB arbitrary object also extends other W3C standards in its data structure: XML Schema (XMLschema)—used to set constraints on the structure and content of documents of that type, above and beyond the basic syntactic constraints imposed by XML itself; XML Signature (XMLDSig)—used to work with enveloped or detached digital signatures; and Canonical Efficient XML Interchange (Canonical EXI)—provides canonical representation of the XML-based data for comparison of logical and physical equivalence. The use of EXI reduces computational overhead and speeds up parsing of compressed documents, in turn increases endurance of small devices by utilizing efficient decompression. In accordance to one embodiment, the basic GPB arbitrary object data structure includes fields describing the object origin, object owner, object transfer history, object modification/transformation history, object type, and object data. Object type and object data are generic fields, intended to be further defined by an implementing object (whether a system-defined object like a Resource Object or a user-defined object like one created in a dApp). XML and similar languages allow this data structure to be extended as necessary for the customization of arbitrary objects. For compatibility purposes, this is best performed in compliance with the APIs 315. MainNet implementations of this invention may reject non-compliant arbitrary objects.

Figure 4:
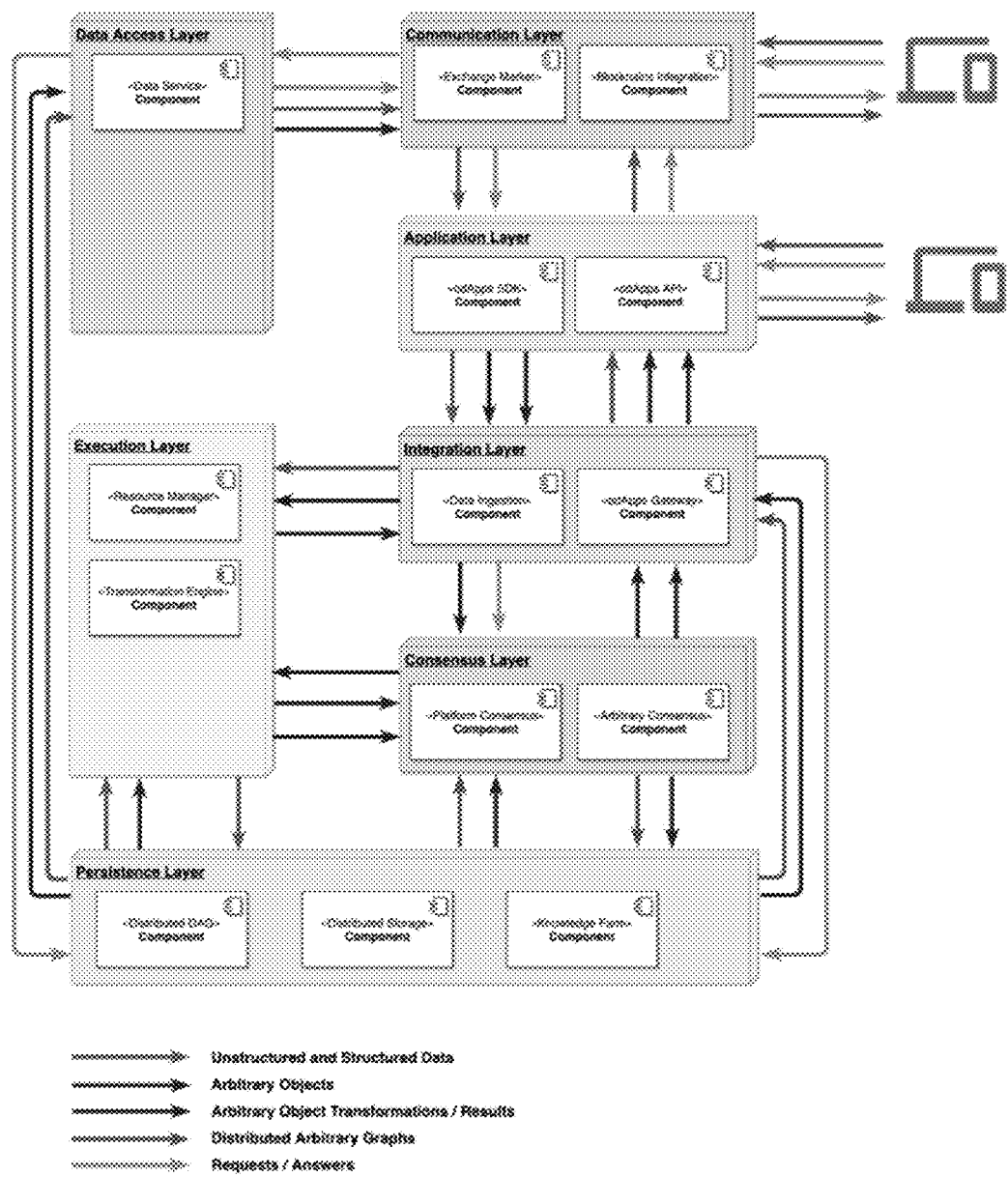
FIG. 4 depicts a logical data flow diagram of the GPB platform's layers.

A GPB arbitrary object further comprises a universal interface to structured data in an object-agnostic manner within the GPB. This universal interface allows objects to encapsulate or reference data of varying formats, even if that data is not structured. This is accomplished through the use of a transformation function which takes as input various forms of structured or unstructured data, such as commonly-used document, audio, or image formats. Commercial technology presently exists that can perform these functions, alternatively the transformation function can be implemented specific for the GPB platform. As noted in above texts, at least a portion of a GPB arbitrary object is specified by the various GPB platform interfaces to allow interoperability. These include the property object and signature sections of the arbitrary object data structure. Separate data sections are defined to provide a placeholder in the arbitrary object data structure for user- or developer-defined content data. Both structured and unstructured data can be stored within these data sections via the XML object wrapper function. Structured data generally can be stored directly (although technically may be stored by reference/link). Unstructured data can be stored as encoded data within a wrapper and/or as link to another object. An optional inter-blockchain operation section can also be defined in the arbitrary object data structure for storing information necessary for inter-blockchain operations. FIG. 4 depicts the data structures of two exemplary embodiments of arbitrary object. In addition, other variant embodiments of arbitrary object include a resource object.

Resource Object

A resource object is a variant (derived) type of GPB arbitrary object that represents a computational resource. An entity providing the computational resources may include a host that is one of stationary or mobile computing device, a host cluster, or a pool in a virtualization platform. The resource object data structure contains a specification section that defines an extensible resource model, which by default includes fields defining the entity providing the computational resource, the type of computational resource, and any of: one or more processing units, one or more forms of transient memory, and one or more forms of persistent data storage. Arbitrary "countable" resources can also be defined in the resource object data structure, which can refer to any addressable computational resource (i.e., in a traditional personal computer, a communications device such as a USB, parallel, or other bus). Resources can be tagged with profile information. Resource profiles provide an easy way for resource consuming users to request a set of specific types of resources with a single request.

Property Object

A property object is another type of GPB arbitrary object that represents data. The property object data structure may contain a pointer, list, element tree, or other data structure referencing or directly containing XML data. The data structure specification includes a mandatory generic data field, which encapsulates the aforementioned XML data, as well as any number of optional additional data fields. These optional data fields may, but need not be, derived from the markup data in the XML markup. (Note: as discussed earlier, other open-standard extensible formats may be used as alternatives to XML.) A property object facilitates the decoupling of data ownership from resource ownership, allowing verification of ownership to be performed separately from the verification of data. This approach helps to manage joint ownership for arbitrary objects, resources, or individual elements of arbitrary objects.

Various implementations of the GPB platform are such that GPB arbitrary objects may contain object data that are the properties themselves, such as NFTs, dNFTs, and other virtual digital objects, within the data structures. In one implementation of the GPB platform of the area of user authentication and identification, the GPB arbitrary objects may contain SBTs. Another exemplary implementation of the GPB platform is the area of medical services in which the GPB arbitrary objects contain medical records. In yet another implementation, the GPB platform may be used to facilitate the interaction and integration between a virtual environment and the physical environment, and in this case, the GPB arbitrary objects may contain reference data referencing physical objects or properties.

Arbitrary Object Transformation

In accordance to another aspect of the present invention, a GPB arbitrary object can be transformed, by the transformation engine 311, in a number of ways including, but not limited to: aggregation—aggregating a GPB arbitrary objects from multiple data sources and/or other objects. (i.e. in a user case of calculating optimal traffic routing based on traffic, weather, and other smart city information); splitting—dividing a single GPB arbitrary object into multiple instances for independent manipulation; derivation—applying one or more business rules to data in a GPB arbitrary object to infer new information; summarization—summarizing a set of two or more original GPB arbitrary objects and generating a new GPB arbitrary object based on the summarized major points of the original GPB arbitrary objects; and validation of any object or data.

Ownership Alterations

In accordance to another aspect, ownership of a GPB arbitrary object is altered by a number of ways including: passing—one-to-one transfer of ownership from an account (user) to another account (user) or from group to group; splitting—dividing the ownership of an object among one or more owners in several (split) ownership of the object, which would also result in an object split; merging/collecting—many-to-one transfer of ownership from multiple accounts (users) to a single account (user), which would also result in an object merge; leasing—temporary assignment of rights to an object, where any rights or derivative ownership alteration initiated by the grantor to a grantee is valid only during the lease period and shall revert back at the end of the lease period; and rent—unrestricted usage (without any ownership rights) of the object during defined rental period of time without permission to pass, split, or lease (note: this is not a true change in "ownership", but the best-mode implementation recognizes this function as related).

Distributed Arbitrary Graph

In accordance to one aspect of the present invention, the GPB platform comprises a distributed arbitrary graph ("DAG"), which is an arbitrary data structure for supporting the operational functionality of the GPB platform including: maintaining consensus persistence for both the platform consensus and the arbitrary consensus; providing access to and verification of ownership of a GPB arbitrary object, validity and consistency of stored information based on the states of GPB arbitrary objects and the relations among GPB arbitrary objects. A DAG usually resembles a traditional node/link graph, in which the ordering of the graph is not linked to the contents of the underlying data. Unlike, for example, a linked list, in which items generally are stored ordinally in a single linear dimension. A DAG can support multiple linkage structures depending on operational needs of a given dApp or service. This provides substantial efficiency, operational, and functionality improvements over traditional existing blockchain-based technologies which primarily rely on linked-list or derivative data structures for maintenance of their data. For example, the whole or portions (i.e. the part that includes nodes 101, 102, 103, 104, 105, and 106) of FIG. 1 may be viewed as a DAG.

Knowledge Farm and Insight Function

In accordance to another aspect of the present invention, the GPB platform comprises a knowledge farm for storing and managing searchable knowledge data and an insight functionality for generating and managing knowledge data and queries. The ability to encapsulate, integrate, and represent arbitrary objects and physical computational devices together in the same plurality of nodes enables the ability to derive knowledge from multiple sources, facilitate communication and interaction among those sources, and integrate their operations in an interoperable fashion without the need for a single proprietary enterprise system or exponential sets of "middleware". In the various embodiments, each GPB node or object needs only to implement one of the GPB platform interfaces or the GPB arbitrary object universal interface, facilitating communication, similar to how the Internet protocol stack and related internetworking protocols enabled then-contemporary networks to interoperate.

The insight functionality creates new knowledge for the knowledge farm by querying the integrated nodes and inherently interoperable GPB arbitrary objects. Furthermore, the metadata generated by the operations of the GPB platform in itself generates knowledge for the knowledge farm and can also be used in determining responses to insight queries.

Additionally, the nature of the DVT data structure comprising the GPB can implement a variety of artificial intelligence data structures, permitting the GPB to directly (by incorporating one or more GPB arbitrary objects in an arbitrary consensus comprising an artificial intelligence data structure) or indirectly (by incorporating other artificial intelligence data structures in one or more GPB arbitrary objects) generate and predict query answers based not only on Large-Language models but also any arbitrary stochastic process capable of being modeled.

Bridging Function

Figure 8:
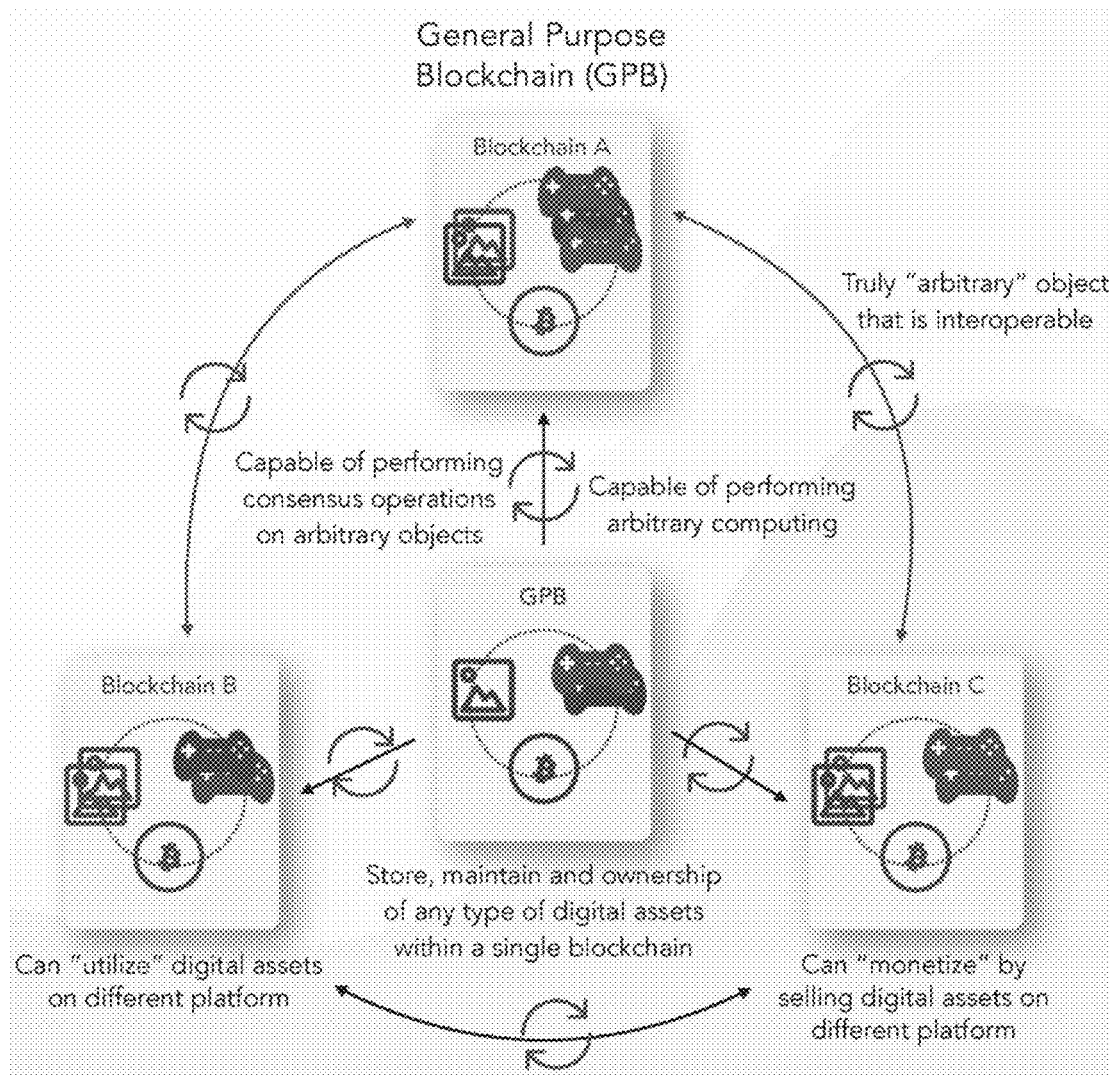
FIG. 8 depicts a schematic diagram illustrating an exemplary embodiment of in-game item transaction using a bridging function of the GPB platform.
Figure 9:
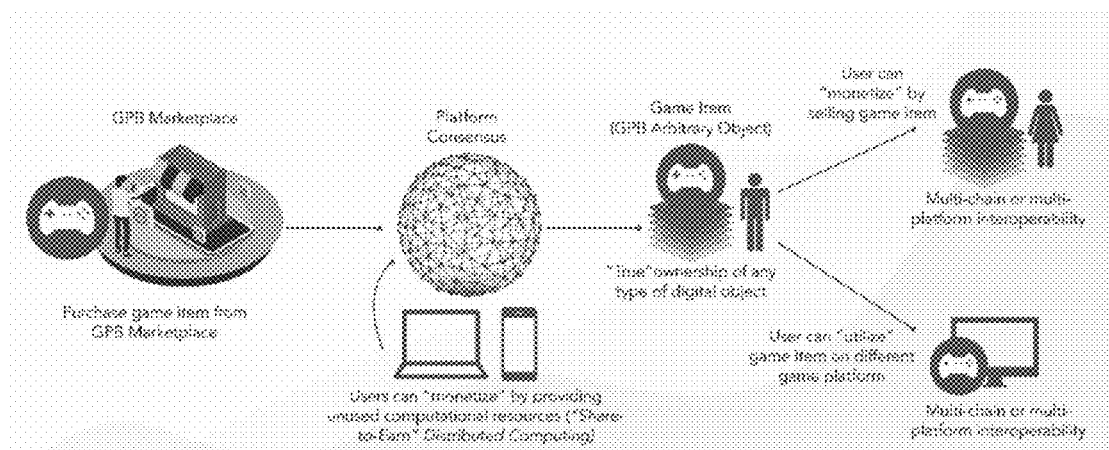
FIG. 9 depicts a schematic diagram illustrating an exemplary embodiment of the integration of the bridging function with other functionalities in the GPB platform.

With reference to FIGS. 8 and 9, in accordance to one implementation of the present invention, the GPB platform enables a bridging function for electronic gaming, which uses the GPB arbitrary objects and the arbitrary consensus to facilitate the management, ownership, transaction, and integration of digital objects, such as in-game items, across and within one or more electronic gaming platforms.

In-game items are digital objects within various apps, consoles, and other electronic games. Often times these are part of the monetization effort of the electronic game, as opposed to historic methods of monetization through sale or licensing of individual copies of the electronic game. Game players can earn or purchase digital objects that interact with other artifacts within the game; for example, a sword in a fantasy role-playing game. Like any digital object, these can be implemented as, referenced by, or encapsulated within a GPB arbitrary object. By definition, all elements and aspects of an electronic game are essentially digital objects, data structures, computational objects, or executable machine instruction modules, and thus can also be implemented as, referenced by, or encapsulated within GPB arbitrary objects.

The GPB platform and its arbitrary consensus can be used to manage, maintain, transact, integrate, and otherwise implement any in-game digital object as an GPB arbitrary object. In addition to providing the benefits of the GPB, they also in key relevant part facilitate the transaction of these digital objects within a single game and across multiple games. Furthermore, the GPB platform and its arbitrary consensus facilitate the linkage of digital objects across different electronic gaming systems. For example, someone who "purchases" a "sword" in one fantasy role-playing game could "take" that same sword with them to another game in which it is compatible. Similar concepts could apply to in-game currency, character attributes, gadgets, etc. Any digital object can be encapsulated in an GPB arbitrary object and therefore could be managed as described above.

This ability therefore enables the bridging of gaming systems—allowing different games to interact with one another, integrate in-game currency, character attributes, gadgets, and other game aspects across multiple games and electronic game systems using the GPB. Under the same principles applying the GPB arbitrary objects and arbitrary consensus as allowing multiple different objects to interact to generate, manage, and maintain knowledge by the insight function and knowledge farm, in-game items can be transacted and maintained and multiple games/platforms can be bridged just by implementing, referencing, or encapsulating them as GPB arbitrary objects with the only requirement being implementing the GPB platform interfaces GPB arbitrary object universal interface as described above.

General Purpose Metaverse

Figure 10:
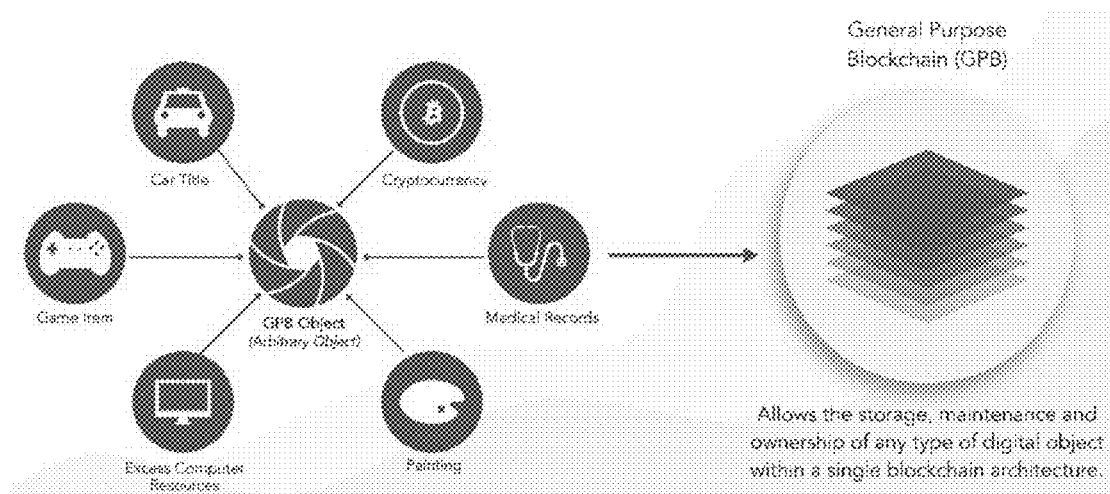
FIG. 10 depicts a schematic diagram illustrating an exemplary embodiment of arbitrary computation and a distributed mechanism for the ownership, sharing, and trade of digital assets, data, and computational resources through the use of the GPB platform.

With reference to FIG. 10, in accordance to another implementation of the present invention, the GPB platform enables a general purpose metaverse. The general purpose metaverse extends the bridging function applied to electronic gaming systems and in-game items to general purpose digital objects, all of which collectively comprise a metaverse instantiation.

A metaverse is by definition a collection of digital objects, such as the Second Life™ electronic gaming platform first released in 2003. The general purpose metaverse is an extension of the concept of in-game items (objects) transacting and bridging games/systems to the general case of metaverses. All metaverses can be logically deduced to a collection of digital objects (i.e., digital environments). Therefore, a metaverse can be represented, referenced, or encapsulated by a plurality of GPB arbitrary objects, and in turn the arbitrary consensus function can be performed on them by implementing the GPB platform interfaces and GPB arbitrary object universal interface for those encapsulating GPB arbitrary objects.

A plurality of nodes in the GPB platform is used to implement a general purpose metaverse in which any arbitrary set of one or more virtual environments can be bridged to permit not only transaction, maintenance, and ownership of digital objects within the GPB platform in a distributed fashion but also the integration across those virtual environments. Furthermore, with the integration with physical computational devices as described above, the general purpose metaverse can integrate with virtual reality and augmented reality functions bridging one or more metaverses and the physical world in a distributed system implementation and maintained via the GPB platform.

Recapturing Deadweight Computing Loss

Figure 11:
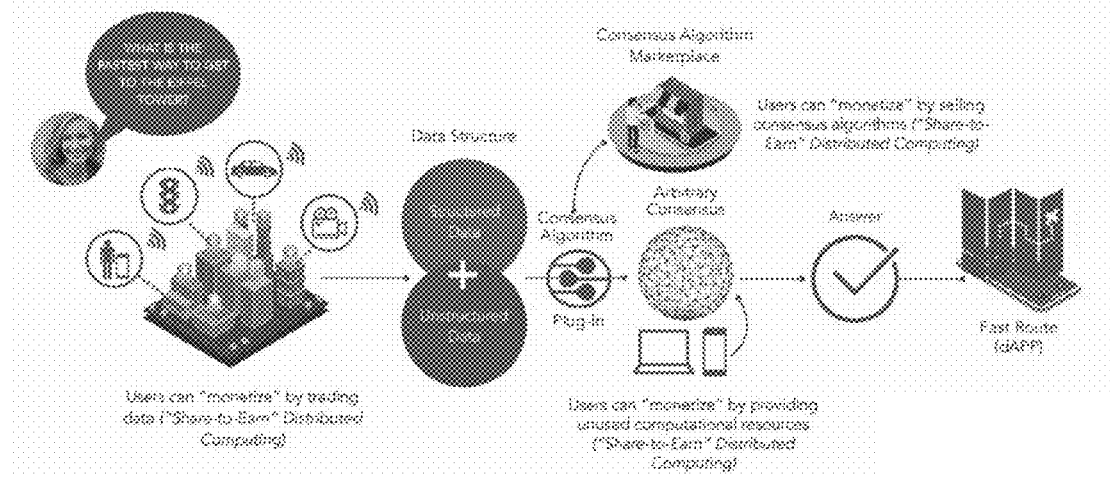
FIG. 11 depicts a schematic diagram illustrating a "share-to-earn" scheme in which nodes in the GPB platform are encouraged to trade data and contribute unused computational resources.

With reference to FIG. 11, in accordance to another aspect of the present invention, the GPB can be used to recapture unused computational cycles maintained by computing systems but generally not used without statistically-significant increases in power, by leveraging parallel computing, power management and computational priority, and memory and other resource virtualization.

Computing systems maintain a "ready" state of computational and memory capacity, including the necessary electrical power therefore, significantly above the capacity and power requirements actually used at any given moment ("deadweight computing resource loss"). This design is to ensure that systems can "spike" to respond to indeterminate frequency and quantity of incoming operational requests as a function of the nature of nearly all those computing systems being internetworked. For example, a typical mobile phone must maintain sufficient computation and memory capacity to handle incoming notifications for apps which can and do arrive in indeterminate frequency and quantity. Notwithstanding sophisticated hardware and software parallelism, power management, and virtualization, a significant amount of computational and memory capacity goes unused at any given moment.

That unused capacity (or "deadweight loss") in computing systems can be recaptured by a distributed system which operates in the background, virtualized, at low priority and fully capitalizes on parallel hardware processing and software operating system design to make those computational and memory resources available to larger scale projects. Previous attempts at doing this were limited by the requirements of centralization (e.g., the SETI@Home project), inefficient and rigid software design, and lack of precision in hardware and operating system priority management to balance increased background computation with increased power. Most such systems simply would operate at "full" capacity, making use of any available resources without respect to power consumption. Similar issues have arisen with first generation (Bitcoin™) and second generation (proof-of-work Ethereum™) cryptocurrency systems.

By applying contemporary hardware and software parallelism capabilities, system resource virtualization capabilities, and near-ubiquitous network connectivity, the GPB platform enables the type of deadweight loss recapture whereby any computing system can "contribute" its unused computational resources without significant power consumption increase. The GPB platform, together with the use of GPB arbitrary objects, encapsulate virtualized resources and isolate them for security purposes as described above, enabling the deadweight loss recapture. The deadweight loss recapture may also be monetized under a "share-to-earn" scheme in which nodes in the GPB platform are encouraged to trade data and contribute unused computational resources.

In addition to creating a "true cloud computing" system (as opposed to a series of virtualized but centrally-maintained and allocated server farms), this approach is orders-of-magnitude more efficient from an economic, physical hardware, and electrical consumption standpoint.

The electronic embodiments disclosed herein may be implemented using general computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

All or portions of the electronic embodiments may be executed in one or more computing devices including server computers, personal computers, laptop computers, mobile computing devices such as smartphones and tablet computers.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A general purpose blockchain (GPB) platform for creating, maintaining, and managing a distributed ledger, comprising:
   a plurality of nodes, each configured to host a GPB for storing GPB arbitrary objects, and implemented by a computing device having at least a processor and electrical circuitry for conducting data communications with other nodes;
   one or more GPB arbitrary objects being stored in one or more of the GPBs, each GPB arbitrary object comprises:
      an object data, where in the object data being a structured or unstructured data;
      a basic data structure implemented in a data markup language that provides self-description of the object data with at least fields for storing the object's origin, the object's owner, the object's transfer history, object's modification/transformation history, the object type, and the object data; and
      a universal interface for providing an encapsulation or reference to the object data for accessing the object data and a transformation function to allow interoperability of object data of different formats;
   wherein each GPB being a data structure having one or more blocks for storing GPB arbitrary objects;
   wherein a plurality of GPBs collectively maintaining consensus of changes of the stored GPB arbitrary objects with a plurality of other GPBs; and
   wherein the object data of each of the GPB arbitrary objects being one of a cryptocurrency token, a non-fungible token, a dynamic non-fungible token, a Soulbound token, a record data object, a virtual object, a reference to a physical object, and a representation of a physical computational device.

2. The GPB platform of claim 1, wherein at least one of the nodes comprises a persistent layer, the persistent layer comprises:
- a distributed arbitrary graph component for building, managing, preserving, and distribution of a distributed arbitrary graph, wherein the distributed arbitrary graph comprises one or more vertices, each representing one of the GPB arbitrary objects and its transformation;
- one or more edges, each representing a relation and reference between a GPB block and a GPB arbitrary object;
- and a storage non-transient memory for storing one or more of the GPB arbitrary objects.

3. The GPB platform of claim 1, wherein at least one of the nodes comprises a security layer, the security layer comprises:
- a user authentication and authorization module;
- a policy management module;
- a cryptographic services module; and
- an identity provider for enrolling, maintaining, and managing identity information for one or more users.

4. The GPB platform of claim 1, wherein at least one of the nodes comprises a data access layer for providing read access to the object data of an GPB arbitrary object stored in a GPB hosted in the node.

5. The GPB platform of claim 1, wherein at least one of the nodes comprises a consensus layer, the consensus layer comprises:
- a platform consensus handler for enabling production and confirmation of GPB blocks, and managing GPB arbitrary object ownership using a proof-of-rating model; and
- an arbitrary consensus handler for providing interfaces to external distributed applications to retrieve confirmations of object data persistence, validate information extraction, tamper resistance for data, and manage object data ownership.

6. The GPB platform of claim 1, wherein at least one of the nodes comprises an execution layer, the execution layer comprises:
- a resource manager for tracking and verifying distributed computational, storage and memory resources, allocating these resources to different nodes in the GPB platform, scheduling and monitoring resources according to demand and resource availability; and
- a transformation engine for scheduling and executing transformations of GPB arbitrary objects.

7. The GPB platform of claim 1, wherein the nodes comprise one or more of:
- mobile nodes configured to generate, transform, and consume data, and generate one or more GPB arbitrary objects;
- light nodes configured to validate one or more arbitrary objects, validate digital signatures and ownerships of arbitrary objects, and validate data transformation;
- storage nodes configured to persist arbitrary objects and distributed arbitrary graphs;
- full nodes configured to validate one or more arbitrary objects, validate digital signatures and ownerships of arbitrary objects, and validate data transformation, and
- public gateway configured to bridge requests from a user to one or more of the nodes.

8. The GPB platform of claim 1, wherein the data markup language is extensible markup language (XML).

9. The GPB platform of claim 1, wherein the data markup language is JavaScript Open Notation.

10. The GPB platform of claim 1, further comprising:
- a knowledge farm for storing and managing searchable knowledge data; and
- an insight function for generating the knowledge data for the knowledge farm by querying one or more of the GPB arbitrary objects and metadata generated by an operation of the GPB platform.

11. The GPB platform of claim 1, wherein at least one of the GPB arbitrary objects comprises an object data that is a representation of a computational device for enabling deadweight loss recapture.

12. A bridging function for electronic gaming, comprising:
- the GPB platform of claim 1;
- wherein at least one of the GPB arbitrary objects comprises object data being an in-game item; and
- wherein the GPB platform facilitates transaction of the GPB arbitrary object comprising the object data that is the in-game item across multiple games or game systems.

13. A general purpose metaverse, comprising:
- the GPB platform of claim 1;
- wherein at least one of the GPB arbitrary objects comprises object data being a virtual object; and
- wherein the GPB platform facilitates transaction of the GPB arbitrary object comprising the object data that is the virtual object across multiple virtual environments.

* * * * *